(12) United States Patent
Yoshida et al.

(10) Patent No.: US 6,808,466 B2
(45) Date of Patent: Oct. 26, 2004

(54) CHAIN TENSIONER

(75) Inventors: Osamu Yoshida, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 88 days.

(21) Appl. No.: 10/387,912

(22) Filed: Mar. 13, 2003

(65) Prior Publication Data

US 2003/0186764 A1 Oct. 2, 2003

(30) Foreign Application Priority Data

Mar. 28, 2002 (JP) .................................. 2002-091895

(51) Int. Cl.[7] .............................................. E16H 7/08
(52) U.S. Cl. ........................................ 474/110; 474/117
(58) Field of Search ................................. 474/101, 109, 474/110, 111, 113, 117, 135, 137, 140

(56) References Cited

U.S. PATENT DOCUMENTS

| 5,304,099 | A | * | 4/1994 | Deppe et al. | 474/110 |
|---|---|---|---|---|---|
| 5,366,415 | A | * | 11/1994 | Church et al. | 474/110 |
| 5,951,423 | A | * | 9/1999 | Simpson | 474/109 |
| 6,244,981 | B1 | * | 6/2001 | Simpson | 474/110 |
| 6,361,459 | B1 | * | 3/2002 | Serkh et al. | 474/133 |
| 6,634,973 | B1 | * | 10/2003 | Simpson et al. | 474/109 |
| 2002/0025869 | A1 | | 2/2002 | Serkh et al. | |
| 2003/0125143 | A1 | * | 7/2003 | Seungpyo | 474/110 |
| 2003/0236144 | A1 | * | 12/2003 | Seunpyo | 474/110 |
| 2004/0029665 | A1 | * | 2/2004 | Yoshida et al. | 474/109 |
| 2004/0029666 | A1 | * | 2/2004 | Yoshida et al. | 474/111 |
| 2004/0127316 | A1 | * | 7/2004 | Hashimoto et al. | 474/109 |

FOREIGN PATENT DOCUMENTS

| JP | 8-93867 | 4/1996 |
|---|---|---|
| JP | 2003-184970 | 7/2003 |

* cited by examiner

Primary Examiner—David A. Bucci
Assistant Examiner—Vicky A. Johnson
(74) Attorney, Agent, or Firm—Howson and Howson

(57) ABSTRACT

In a chain tensioner having a plunger biased to protrude from a housing by a spring, a pair of wedge-shaped cams are received in tapered recesses in the end of the housing, cooperate with racks formed on opposite sides of the plunger, and are urged against oblique seats formed by the tapered recesses by a biasing spring. The cams and racks produce a ratcheting action maintaining chain tension by preventing retracting movement of the plunger. The cams and racks disperse the load imparted to the plunger by the chain, and reduce localized wear, allowing the housing to be made from a light weight material such as aluminum. Accuracy requirements associated with conventional pawl-type ratcheting tensioners are avoided.

6 Claims, 10 Drawing Sheets

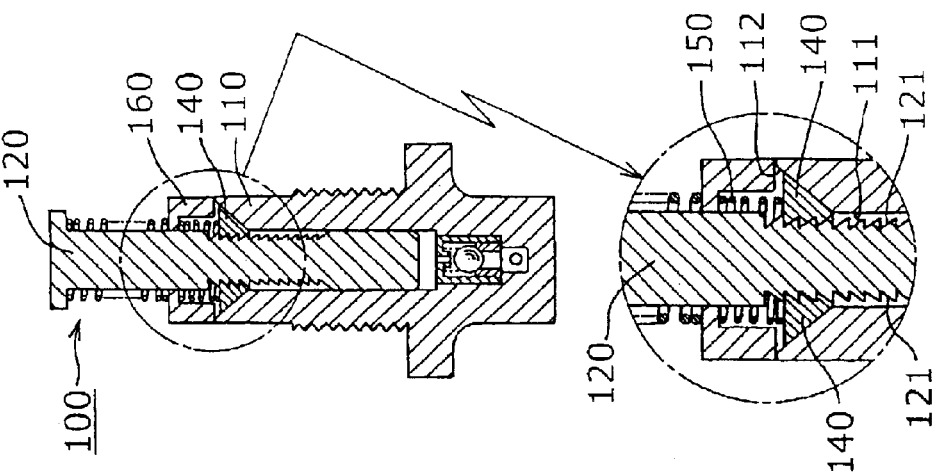
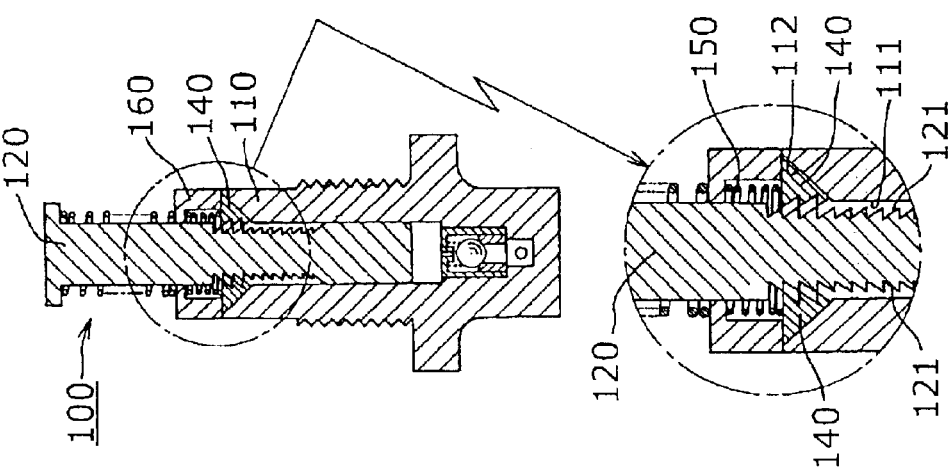
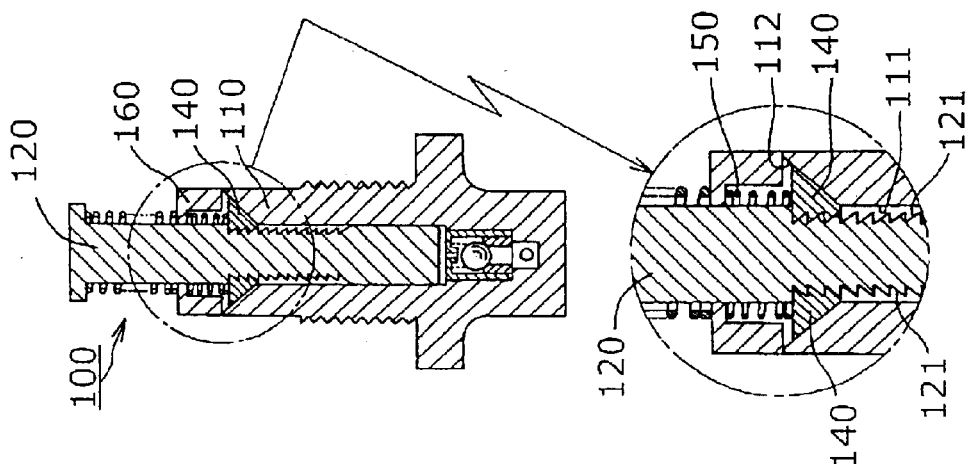

CHAIN TENSIONER

FIELD OF THE INVENTION

This invention relates to a chain tensioner for maintaining proper tension in a power transmitting chain. The tensioner has utility, for example, in maintaining tension in the timing chain of an internal combustion engine, where the chain transmits power from a crankshaft sprocket to one or more camshaft sprockets.

BACKGROUND OF THE INVENTION

In a conventional tensioner, a plunger, protruding from a housing, exerts a force on the back of a pivoted tensioner lever having a shoe in sliding contact with the slack (return) run of a chain in order to maintain tension in the chain. The plunger of the tensioner engages the lever at a location remote from the pivot axis of the lever.

A conventional ratchet type tensioner 500, as shown in FIGS. 9 and 10, comprises a plunger 510, slidable in a hole 531 formed in a housing 530. The plunger protrudes from the housing, and is biased in the protruding direction by a spring 520. A pawl 550, pivotally supported by a pin 540 on the housing 530, is biased by a spring 560 so that its pawl teeth 551 engage teeth 511 formed on the outer periphery of the plunger.

When the plunger 510 protrudes from the housing 530 as a result of loosening of the chain, and is thereafter subjected to an impact force from the tensioner lever, the ratchet mechanism blocks retraction of the plunger by engagement of the pawl teeth 551 with the ratchet teeth 511 on the plunger.

When the ratchet operates to prevent retraction of the plunger, the ratchet pawl 550 applies a sideways force to the plunger, which results in eccentric loads, indicated by arrows F1 and F2 in FIG. 10, exerted by the plunger on the hole 531. Especially when the housing 530 is formed of aluminum, these loads can result in significant localized wear.

In the conventional ratchet-type tensioner 500, when the plunger 510 is subjected to excessive impact force from the tensioner lever, the impact force is concentrated on the ratchet teeth 511 and the pawl teeth. The impact force produces significant wear of the tips of these teeth, and failures due to excess wear or breakage of the teeth can occur.

Furthermore, in the conventional ratchet-type tensioner 500, the control of tension in a traveling chain depends on engagement between the ratchet teeth 511 and the pawl teeth 551. To attain smooth engagement of these teeth, high accuracy in the diameter and mounting position of the pivoting pin 540 are required. Troublesome problems have been encountered in the production of the pin, and also in the production of a pawl with an accurately positioned pin-receiving hole having the proper diameter.

Among the objects of the invention are the solution of the above-described problems, and the provision of a chain tensioner which can disperse and reduce the load applied to the plunger, which exhibits superior wear resistance, and which can reduce the requirement for high accuracy in production of components and assembly thereof.

SUMMARY OF THE INVENTION

The chain tensioner in accordance with the invention is similar to a conventional chain tensioner in that it comprises a housing having a plunger-receiving hole with an opening, a plunger slidably fitting into the plunger-receiving hole and protruding from the opening thereof in a protruding direction, and a spring biasing the plunger in the protruding direction.

The chain tensioner differs from the conventional chain tensioner in that it comprises toothed racks formed on opposite sides of the plunger, and a pair of wedge-shaped cams on opposite sides of the plunger, each cam being disposed adjacent one of the respective toothed racks, each the cam having teeth Mockingly engageable with teeth of the adjacent rack to prevent retracting movement of the plunger relative to the cams, and each cam having an oblique surface for engagement with a seat. The oblique surface of each cam faces outwardly away from the plunger, and the shape of each oblique surface is such that the oblique surface has an outer end disposed farther than an inner end thereof along the protruding direction of the plunger. Oblique cam seats are formed in the housing on opposite sides of the plunger, and the oblique surfaces of the cams conform to, and are in engagement with the oblique cam seats and slidable thereon to an extent such that the teeth of the cams can be brought into and out of locking engagement with the teeth of the racks. A spacer is disposed on the housing adjacent the opening, and a second spring, engaged with the spacer and the cams, urges the cams in a direction opposite to the protruding direction of the plunger so that the cams are urged into locking engagement with the toothed racks.

In a preferred embodiment, the plunger and housing define an oil chamber within the housing, and a hydraulic valve mechanism is provided on the housing for allowing one-way flow of oil from an external supply of oil under pressure into the oil chamber to apply an additional force biasing the plunger in the protruding direction.

In a preferred embodiment of the invention the plunger is rotatable in the housing, so that engagement between the rack and the wedge-shaped cams can be forcibly released.

If the plunger-biasing spring is interposed between the flange and the spacer, it is more easily installed, and can be used to hold the spacer against the housing.

In an alternative embodiment, the plunger-biasing spring is disposed in the plunger-receiving hole and is interposed between an end of the plunger located within the hole and an end of the hole. In this case, the spacer is preferably screwed into housing.

The chain tensioner of the invention may be either the inner mounting type or an outer mounting type.

The teeth on the plunger racks and the cams can take various forms so long as they are capable of exhibiting a ratcheting action allowing the plunger to move in the protruding direction but preventing retraction thereof. The protrusion biasing spring causes the plunger to move rapidly in the protruding direction when the chain becomes loose, thereby reestablishing proper tension.

The cam biasing spring, which is loosely fitted onto the plunger, biases the wedge-shaped cams against their seats, which, in turn, exert a radially inward force on the cams so that they are urged into engagement with the plunger. However, when the plunger moves in the protruding direction, it draws the cams with it in the protruding direction, and at the same time its teeth, in cooperation with the teeth of the cams, urge the cams radially outwardly, holding the cams against their seats until the teeth disengage. At the instant when the teeth become disengaged the plunger will move forward by one tooth of the rack, and the cams are immediately reengaged with the rack, to prevent retracting movement of the plunger, and maintaining proper chain tension.

The use of cams on opposite sides of the plunger distributes the force applied by the chain to the plunger, thereby avoiding concentrated loads on the housing. Moreover, the cams distribute the force symmetrically, avoiding eccentric loads as in the case of the conventional tensioner.

Furthermore, in the chain tensioner according to the invention, even when the plunger is subjected to excessive impact force from the chain through a tensioner lever, the plunger is prevented from retracting so that proper chain tension is maintained.

BRIEF DESCRIPTION OF THE DRAWINGS

FIGS. 4(a)–4(c) are sectional views of the chain tensioner shown in FIG. 1, illustrating stages in the operation thereof;

DETAILED DESCRIPTION OF THE PREFERRED EMBODIMENTS

The chain tensioner 100 of the first embodiment, illustrated in FIGS. 1–5, is an "outer attachment" type chain tensioner, which is attached from the outside of an engine. The tensioner is used to suppress the vibration generated as a timing chain TC travels over a crankshaft sprocket S1 and camshaft sprockets S2 of an engine and also to maintain proper tension in the chain.

In the chain tensioner 100, a spring-biased cylindrical plunger 120 protrudes toward the timing chain TC, which travels past a tensioner housing 110 attached to a wall E of the engine block wall. The tensioner plunger presses against the back surface of a tensioner lever TL, which is pivoted on the engine block, so that a shoe surface of the tensioner lever TL is held in sliding contact with the slack side of the timing chain TC to maintain tension in the timing chain.

A tensioner guide TG, fixed to the engine block, guides the timing chain TC so that side run-out of the timing chain TC is prevented.

Figure 1:
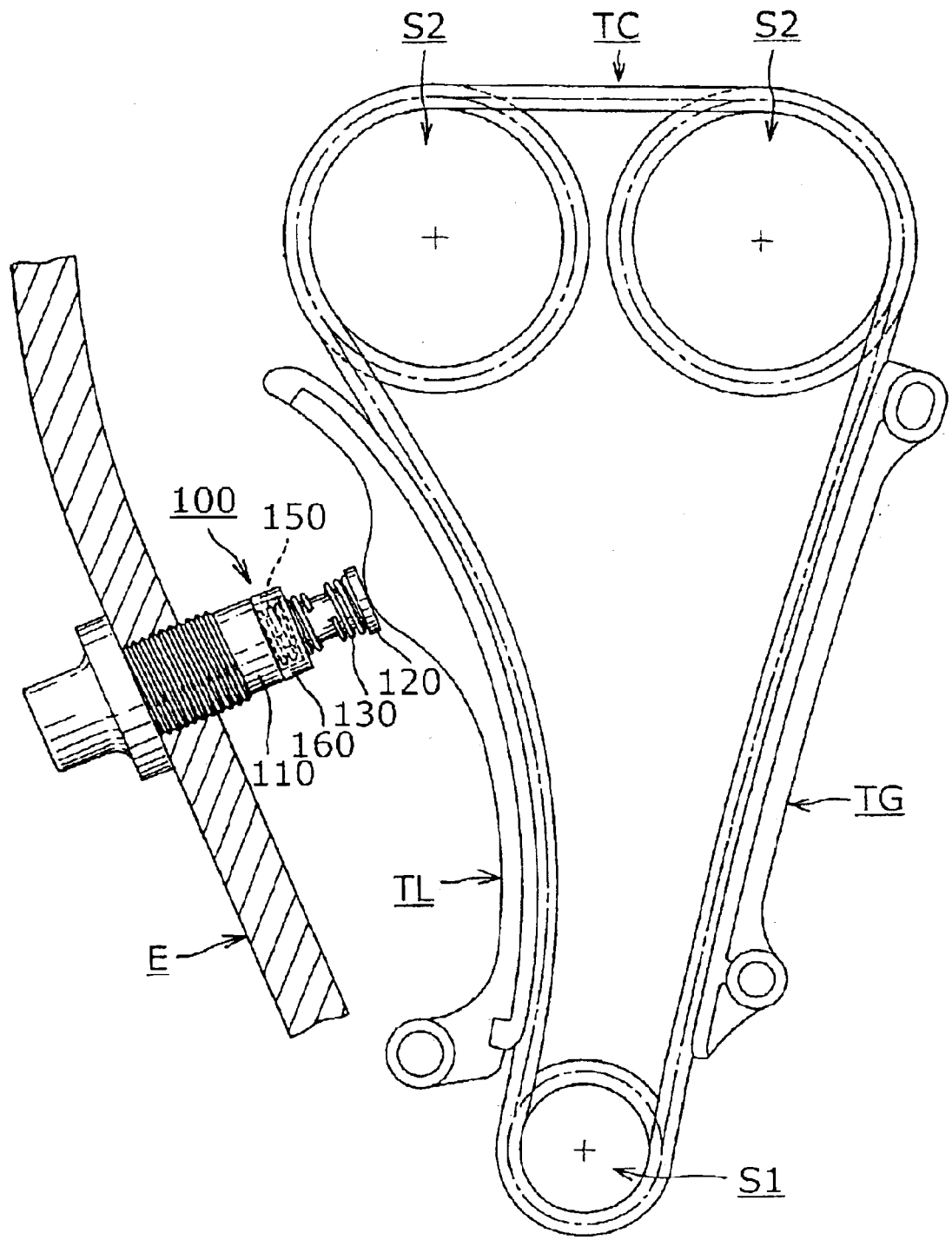
FIG. 1 is an elevational view showing a chain tensioner in accordance with a first embodiment of the invention installed in an internal combustion engine to maintain tension in a timing chain.
Figure 2:
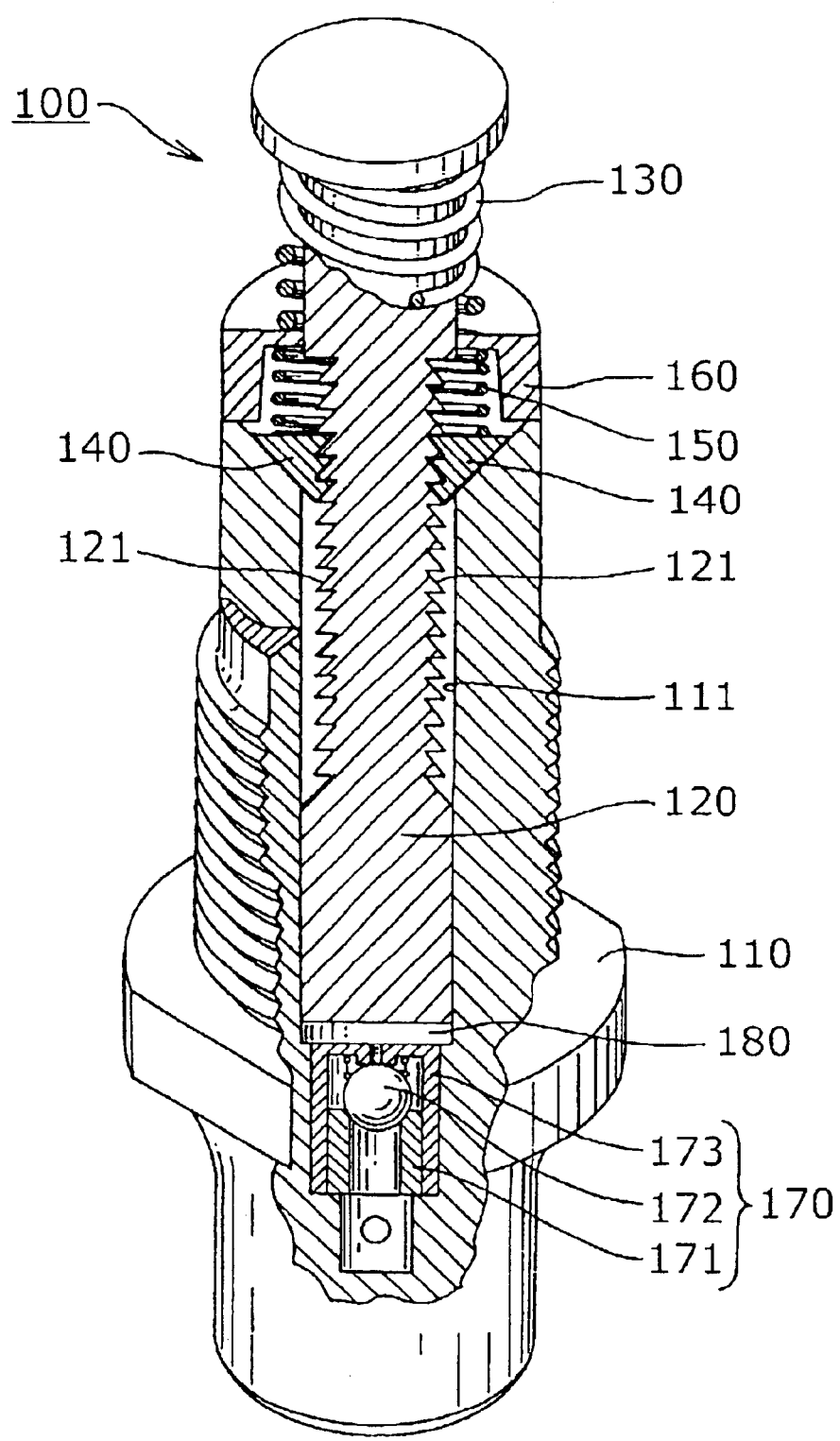
FIG. 2 is a partly cut away perspective view of the chain tensioner shown in FIG. 1.
Figure 3:
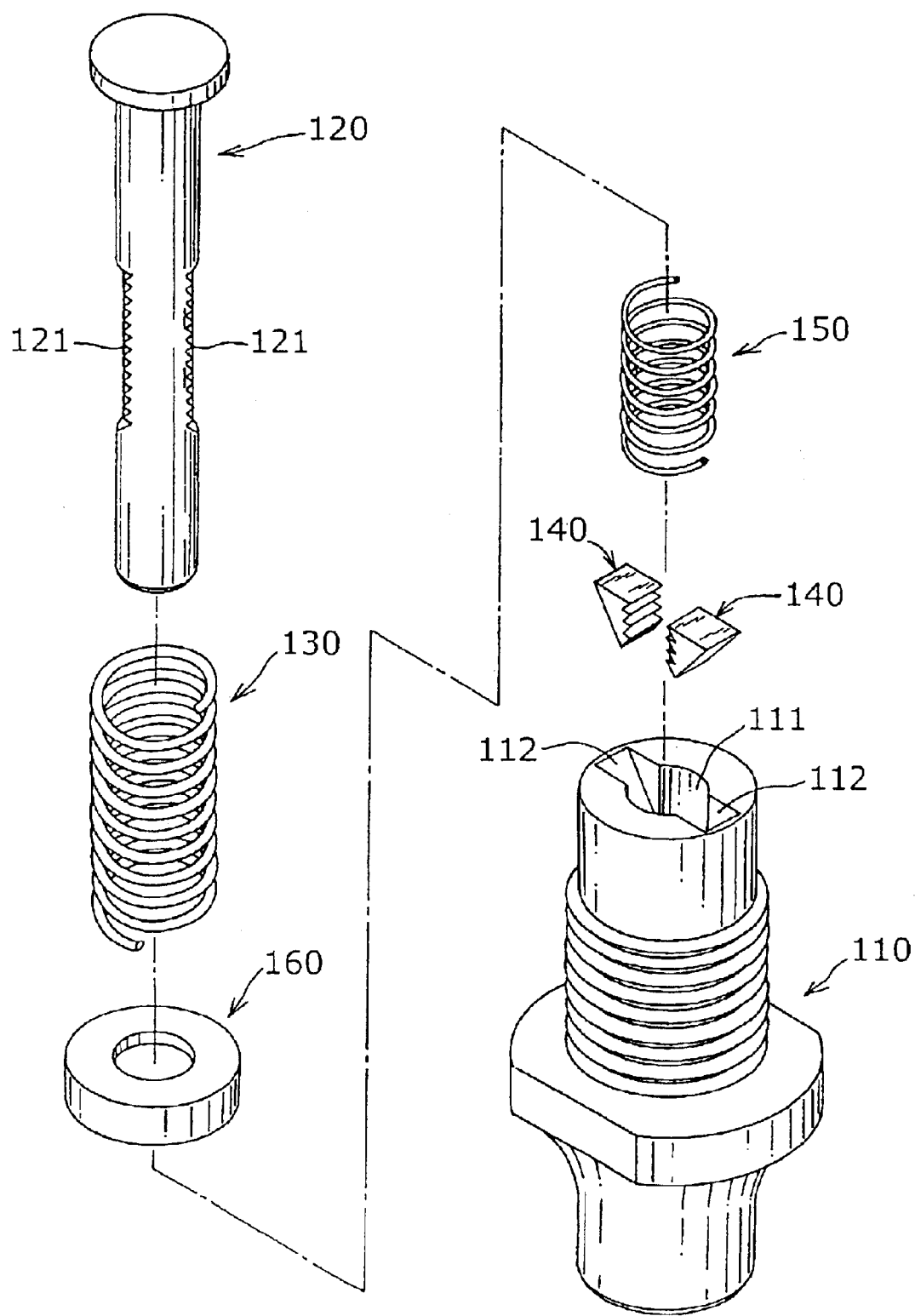
FIG. 3 is an exploded perspective view of the chain tensioner shown in FIG. 1.

As shown in FIGS. 2 to 4, the chain tensioner 100 includes a housing 110 having a plunger-receiving hole 111 into which a plunger 120 is inserted. The plunger protrudes from the hole, and a spring 130, which surrounds the plunger and is in engagement with a flange formed at the outer end of the plunger, biases the plunger 120 in the protruding direction. Two wedge-shaped cams, which are in the nature of cam chips, are engaged respectively with two toothed racks separately formed on opposite sides of the plunger 120. The wedge-shaped cams are disposed in tapered recesses formed in the front end of the housing on opposite sides of the front opening of the plunger-receiving hole 111. These cams are in sliding engagement with obliquely tapered cam seats 112 constituted by walls of the recesses, as shown in FIG. 2. A cam biasing spring 150 surrounds the plunger with clearance, biasing the cams 140 against the obliquely tapered seats so that the cams are urged radially inwardly into engagement with the plunger. The biasing spring 150 is held between the cams and a spacer 160, which is held against the end of the housing by spring 130.

A hydraulic valve mechanism 170 is provided at a rear end portion of housing 110 for receiving oil under pressure from an external oil supply source and accurately controlling the protrusion biasing force of the plunger 120. This hydraulic valve mechanism 170 comprises a ball seat 171 press-fit into the housing 110, a check ball 172 engageable with the ball seat 171, and a retainer 173 for retaining the check ball 172. The valve mechanism permits the flow of oil into a high pressure oil chamber 180 defined by plunger 120 and hole 111, but blocks reverse flow of oil from the high pressure oil chamber 180, so that tension is imparted to, and maintained smoothly in, the chain by plunger 120.

In the operation of the chain tensioner 100, when the timing chain TC becomes loose, the plunger 120, biased by the protrusion biasing spring 130, immediately moves in the protruding direction.

FIG. 4(a) shows the condition of the tensioner before the plunger protrudes, FIG. 4(b) shows the tensioner as the plunger is moving in the protruding direction, and FIG. 4(c) shows the plunger moved forward by one tooth.

When the plunger 120 moves in the protruding direction to maintain tension in the timing chain, the racks 121 on the plunger 120 draw the cams 140, which are initially in the position shown in FIG. 4(a), in the protruding direction against the force applied to them by the biasing spring 150. As the cams are drawn in the protruding direction, a camming action exerted by the teeth of the racks, which are in the shape of ratchet teeth causes the cams to slide radially outward while in engagement with the tapered seats 112. The cams simultaneously rise and move outward, while sliding on the tapered seats, to a position where they become disengaged from the rack teeth on the plunger, as shown in FIG. 4(b).

When the cams 140 rise on the tapered surfaces of the tapered cam sliding seats 112 and the engagement with the racks 121 by the plunger 120 is relieved, the plunger 120 moves forward by one tooth. Spring 150 then immediately pushes cams 140 downward, that is, in the direction of retraction of the plunger, as shown in FIG. 4(c), and the engagement between the cam teeth and the racks blocks retraction of the plunger 120.

Figure 5:
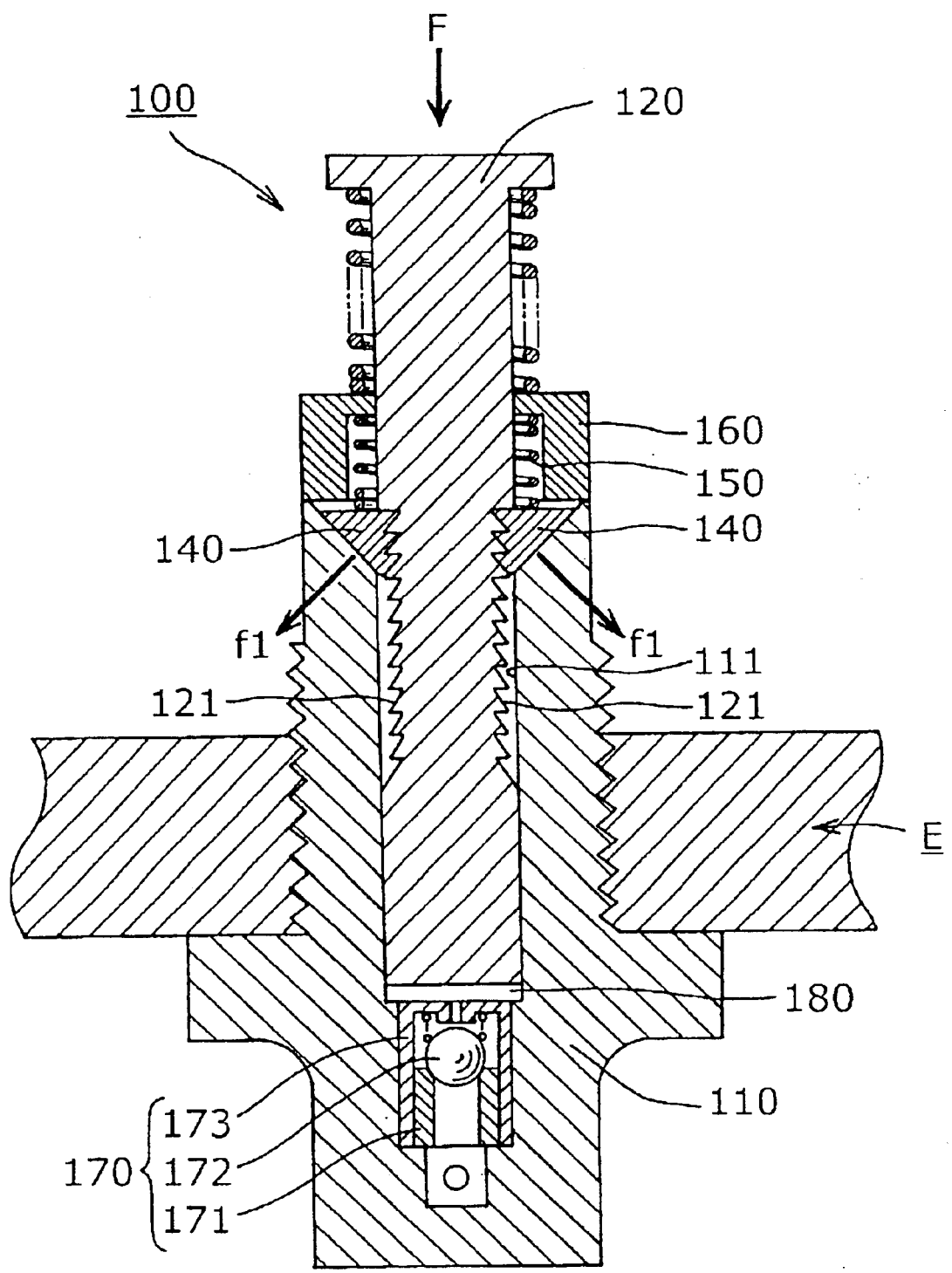
FIG. 5 is a sectional view illustrating the distribution of load in the chain tensioner of FIG. 1 when a force is applied to the plunger.

As shown in FIG. 5, the force F received by the plunger 120 is split into forces f1 and f2, which are applied to the seats on opposite sides of the plunger. Thus the load applied to the housing 110 is distributed so that concentration of the load is avoided. Moreover, as mentioned previously, the load is distributed symmetrically so that eccentricity is avoided.

When a traveling timing chain TC loosens, the plunger 120 is moved forward sequentially, one tooth at a time, to impart proper chain tension to the chain. At the same time, reverse movement of the plunger is prevented so that proper chain tension can be maintained. Although the housing 110 is made of aluminum in the present example, localized wear of the kind which occurs in a conventional housing is avoided. Moreover, a significant reduction in the overall weight of the tensioner can be achieved.

The invention affords other significant benefits. Since a simple cam support structure is used, in which a pair of cams 140 are inserted into tapered recesses, the problem of achieving the high manufacturing accuracy and high mounting accuracy required in the case of a pivot pin and pin hole for pivotally supporting a pawl are avoided. Moreover, the difficulties encountered in manufacturing and assembling the ratchet pawl, and achieving accuracy therein, are also avoided, and the working accuracy and working load in the part working and the assembly working can be reduced.

Furthermore, by using the protrusion biasing spring 130, interposed between a front end of the plunger 120 and the spacer 160, to hold the spacer 160 in abutting relationship with the front of the housing, the cams 140 can be easily inserted into their recesses, and a simple device configuration, and easy assembly thereof, can be realized.

Because the two racks 121 are situated on opposite sides of the plunger 120, the plunger can be rotated in the housing by 90 degrees to release the racks from the cams 140. Accordingly, assembly can be carried out easily, and the engagement between the racks and the cams can be released easily for maintenance or for checking the timing chain.

Figure 6:
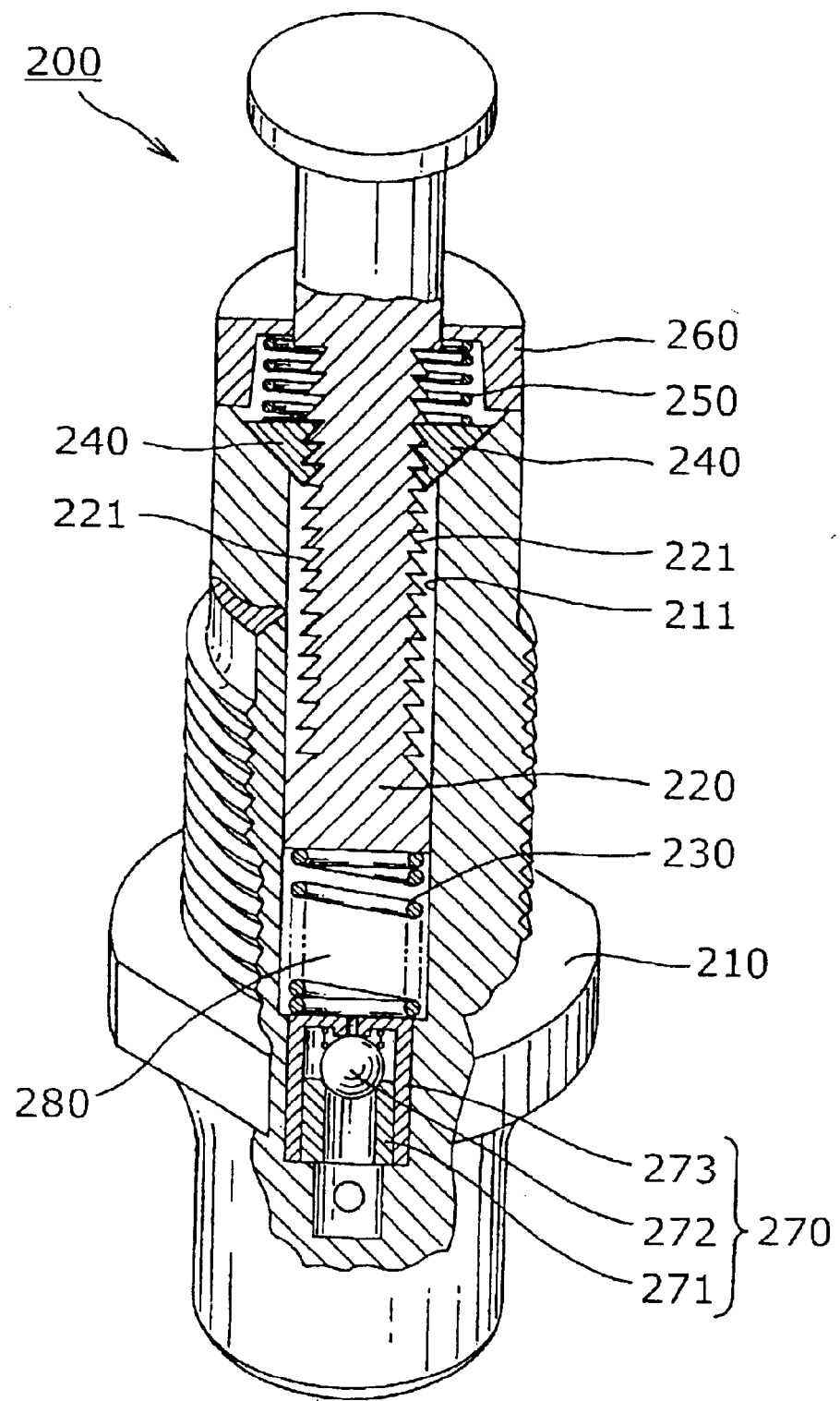
FIG. 6 is a partly cut away perspective view of a chain tensioner in accordance with a second embodiment of the invention.
Figure 7:
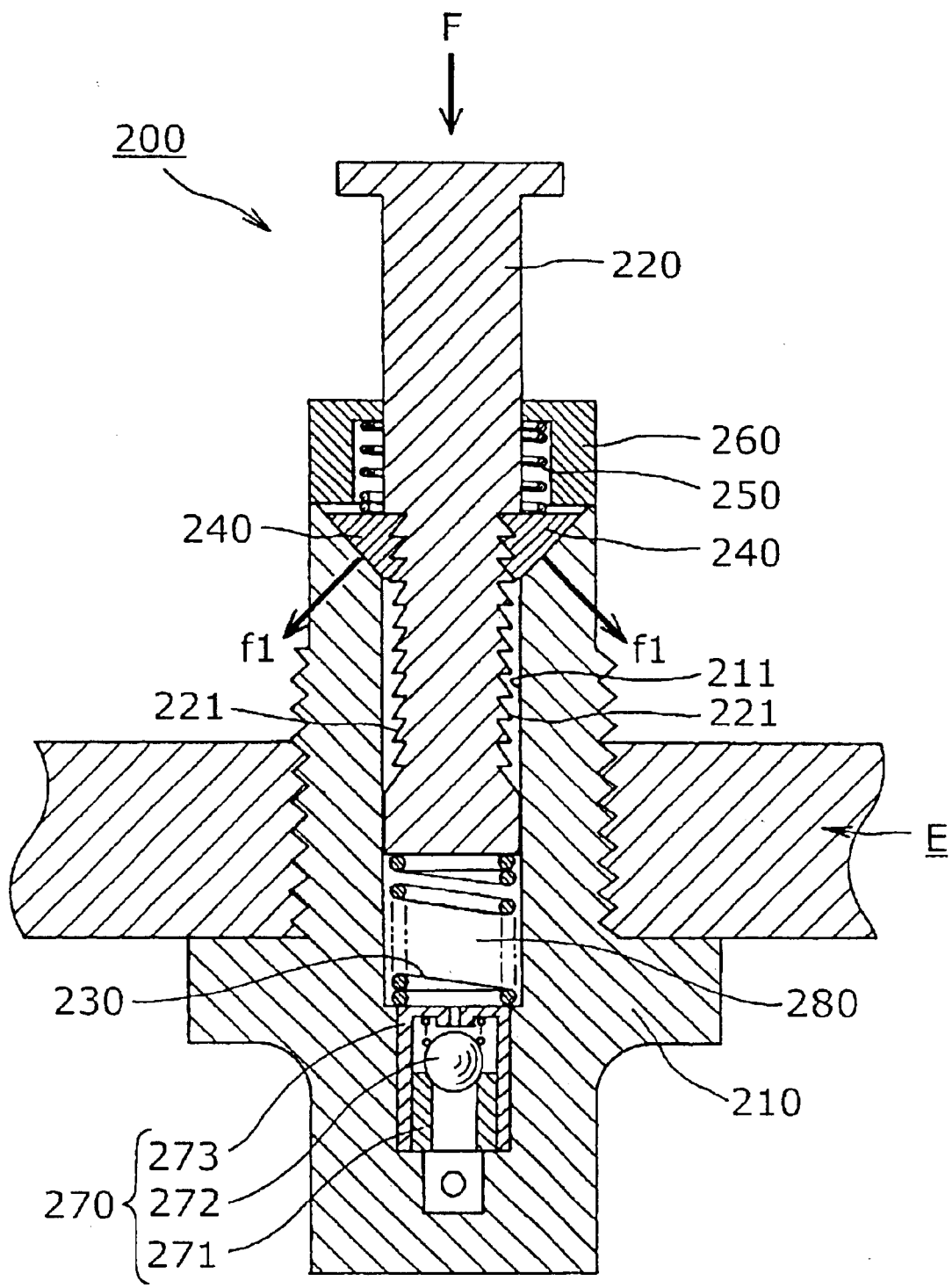
FIG. 7 is a cross-sectional view of the chain tensioner shown in FIG. 6.

The chain tensioner 200, according to a second embodiment of the invention is shown in FIGS. 6 and 7. This tensioner is also an outer attachment type tensioner, having the same structure as that of the first embodiment. Accordingly, reference numbers in FIGS. 6 and 7 exceed the reference numbers designating corresponding components in FIGS. 1–5 by 100.

In FIGS. 6 and 7, a protrusion biasing spring 230 is interposed between the rear end of the plunger 220 and the bottom of plunger-receiving hole 211. The spacer 260 is screwed to the front end of the housing. That is, it may be secured to the front end of the housing 210 by screw fasteners, or alternatively, it may be threaded onto the front end of the housing. Many of the features of operation and advantages of the second embodiment are substantially the same as those of the first embodiment.

The tensioner 200 can be miniaturized by reducing the distance from the front end of the plunger 220 to the front end of the housing 210. Moreover, the tensioner can be arranged nearer to the chain, so that its response to changes in tension of the timing chain TC can be improved. Additionally, in this embodiment, the plunger 220 is prevented from separating from the housing by the fact that the spacer 260 is independently secured to the housing. Therefore disengagement of the plunger from the housing is prevented.

Figure 8:
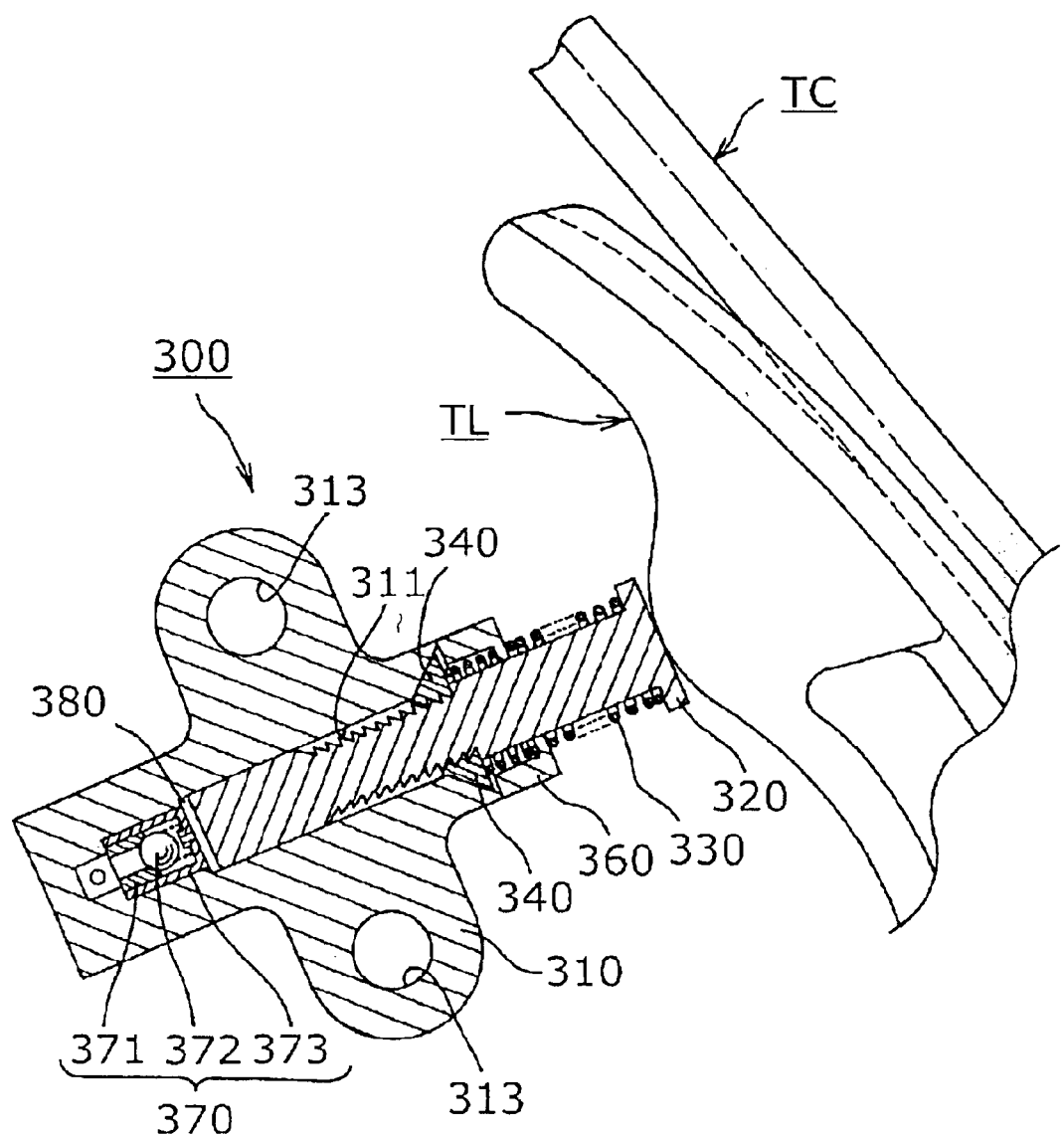
FIG. 8 is a schematic view showing a chain tensioner in accordance with a third embodiment of the invention, illustrating the relationship of the tensioner with a tensioner lever and a transmission chain.
Figure 9:
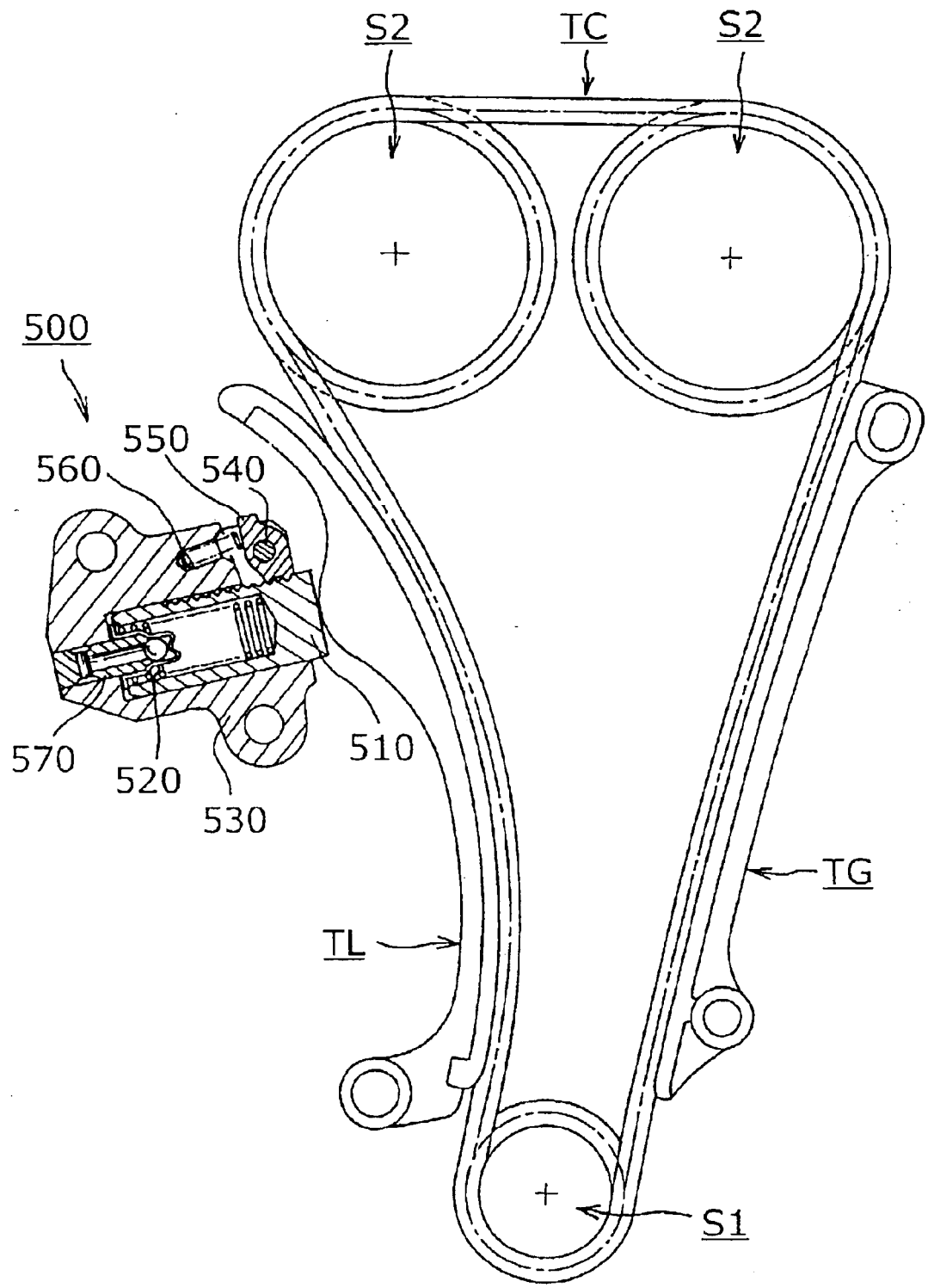
FIG. 9 is an sectional view of a conventional ratchet type tensioner.
Figure 10:
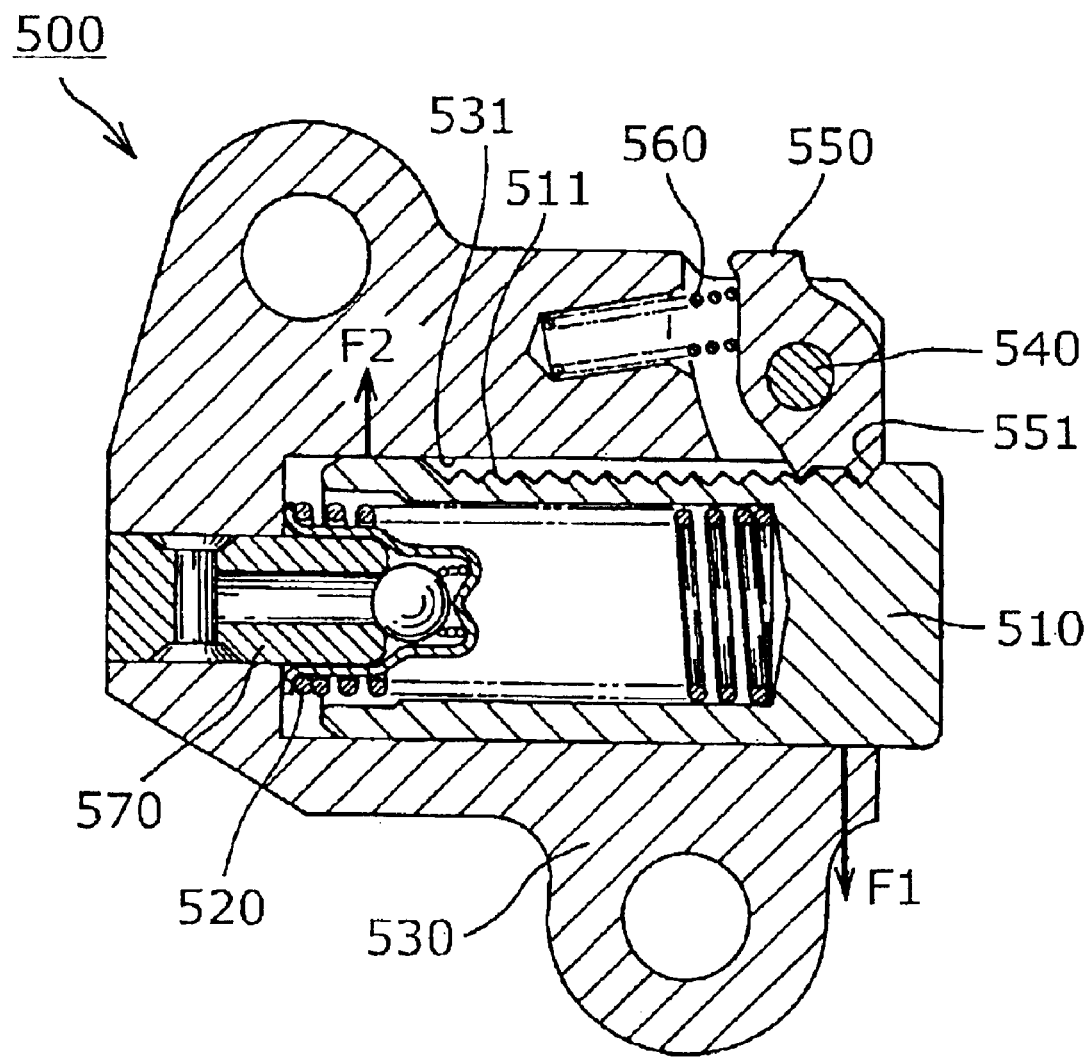
FIG. 10 an elevational view showing a conventional chain tensioner installed in an internal combustion engine to maintain tension in a timing chain.

In FIG. 8, tensioner 300, which is a third embodiment of the invention, has the same basic structure as in the first embodiment. Here, components are designated by reference numbers that exceed by 200 the reference numbers for corresponding components in FIGS. 1–5.

The chain tensioner 300 differs from the tensioner of the first embodiment principally in that mounting holes 313 are provided for mounting the chain tensioner 300 on an engine block inside the engine, so that this tensioner is a "inner attachment" type tensioner. Otherwise, the features of operation and advantages of the third embodiment are substantially the same as those of the first embodiment.

Although the chain tensioners have been were described as used with a timing chain TC they can also be used with a timing belt.

Important advantages of the invention may be summarized as follows.

The tensioner not only maintains proper chain tension but also distributes the force exerted on the tensioner plunger by the chain through both cams to the cam seats on opposite sides of the plunger. Accordingly, localized wear of the housing, of the kind generated in a conventional tensioner, is avoided. The invention also results in an overall reduction in the weight of the tensioner. In particular, because localized wear is reduced, the housing, which accounts for most of the weight of a conventional tensioner, can be formed of aluminum, and a significant weight reduction can be realized.

Another important advantage is that the cam support structure, in which a pair of cams are inserted into tapered recesses, avoids the problems associated with the high accuracy requirements in the case of a ratchet-type tensioner utilizing a pawl. Moreover, even if a rack tooth or a pawl tooth is broken, exchange and maintenance can be carried out quickly and easily.

The cam and rack mechanism in accordance with the invention can be used advantageously in a tensioner having a hydraulic valve mechanism for introducing oil from an external oil supply in order to control the protrusion biasing force accurately. Accordingly, proper chain tension can be imparted and maintained in a smooth manner.

The invention has the further advantage that the racks and cams can be easily disengaged by rotating the plunger. Accordingly, the tensioner can be assembled easily, and can be disassembled easily for maintenance of the tensioner or for checking or maintaining the timing chain.

In the cases where the protrusion biasing spring is interposed between the front end of the plunger and the spacer, handling of the protrusion biasing spring is easy, and the spacer may be held against the front of the housing by the spring without the need for threads or fasteners.

In the second embodiment, in which the protrusion biasing spring is interposed between the rear end of the plunger and the bottom of the plunger-receiving hole, the distance from the front end of the plunger to the front end of the housing can be reduced, and the tensioner can be arranged nearer to the chain for improved responsiveness to changes in tension in the chain.

In the second embodiment, since the spacer is independently secured to the front end of the housing, the plunger can be more reliably prevented from disengagement from the housing.

We claim:

1. A chain tensioner comprising:
   a housing having a plunger-receiving hole, said hole having an opening;
   a plunger slidably fitting into said plunger-receiving hole and protruding from the opening thereof in a protruding direction; and
   a first spring biasing said plunger in said protruding direction;
   wherein the improvement comprises:
   toothed racks formed on opposite sides of said plunger;
   a pair of wedge-shaped cams on opposite sides of said plunger, each said cam being disposed adjacent one of the respective toothed racks, each said cam having teeth lockingly engageable with teeth of the adjacent one of said racks to prevent retracting movement of the plunger relative to said cams, and each cam having an oblique surface for engagement with a seat, said oblique surface of each cam facing outwardly away from said plunger, the shape of each said oblique surface being such that the oblique surface has an outer end disposed farther along said protruding direction than an inner end thereof;

a pair of oblique cam seats formed in said housing on opposite sides of said plunger, the oblique surfaces of the cams conforming to, and being in engagement with said oblique cam seats and slidable thereon to an extent such that the teeth of the cams can be brought into and out of locking engagement with the teeth of said toothed racks;

a spacer disposed on the housing adjacent said opening; and a second spring engaged with said spacer and said cams, said second spring urging said cams in a direction opposite to said protruding direction whereby the cams are urged into locking engagement with said toothed racks.

2. A chain tensioner according to claim 1, in which said plunger and said housing define an oil chamber within said housing, and including a hydraulic valve mechanism on said housing for allowing one-way flow of oil from an external supply of oil under pressure into said oil chamber to apply an additional force biasing said plunger in the protruding direction.

3. A chain tensioner according to claim 1, in which said plunger is rotatable in said housing, whereby engagement between said rack and said wedge-shaped cams can be forcibly released.

4. A chain tensioner according to claim 1, in which the protruding portion of said plunger has a flange, and in which said first spring is interposed between said flange and said spacer.

5. A chain tensioner according to claim 4, in which said spacer is held against the housing by said first spring.

6. A chain tensioner according to claim 1, in which said first spring is disposed in said plunger-receiving hole and is interposed between an end of the plunger located within said hole and an end of said hole.

* * * * *